United States Patent [19]

Ishiwata et al.

[11] Patent Number: 5,475,554
[45] Date of Patent: Dec. 12, 1995

[54] MAGNETIC HEAD USING SPECIFIED FE TA N CU OR FE TA N AG ALLOY FILM

[75] Inventors: Nobuyuki Ishiwata; Chizuko Wakabayashi, both of Tokyo, Japan

[73] Assignee: NEC Corporation, Tokyo, Japan

[21] Appl. No.: 187,010

[22] Filed: Jan. 27, 1994

Related U.S. Application Data

[62] Division of Ser. No. 688,407, Apr. 22, 1991, Pat. No. 5,304,258.

[30] Foreign Application Priority Data

Apr. 20, 1990 [JP] Japan .................................. 2-104952

[51] Int. Cl.[6] .............................. G11B 5/00; G11B 5/147
[52] U.S. Cl. ...................... 360/126; 360/125; 428/692; 428/694 R; 428/900; 428/432; 428/469
[58] Field of Search ...................... 148/306, 312, 148/313, 314, 302, 121, 318; 420/89, 82, 128, 83; 428/692, 694 R, 900, 432, 469; 360/110, 125, 126

[56] References Cited

U.S. PATENT DOCUMENTS

| | | | |
|---|---|---|---|
| 4,623,387 | 11/1986 | Masumoto | 420/41 |
| 4,881,989 | 11/1989 | Yoshizawa et al. | 148/302 |
| 4,920,013 | 4/1990 | Kobayashi et al. | 428/694 |
| 4,935,314 | 6/1990 | Kobayashi et al. | 428/694 |
| 4,985,089 | 1/1991 | Yoshizawa et al. | 148/303 |
| 5,019,190 | 5/1991 | Sawa et al. | 148/306 |
| 5,069,731 | 12/1991 | Yoshizawa et al. | 148/305 |
| 5,117,321 | 5/1992 | Nakanishi et al. | 360/120 |

*Primary Examiner*—Stevan A. Resan
*Attorney, Agent, or Firm*—Sughrue, Mion, Zinn, Macpeak & Seas

[57] ABSTRACT

A magnetic head includes a magnetic alloy material suitable for high density recording having a composition of $(Fe_xM_yN_z)_aL_b$, where L is Cu and/or Ag. The provision of Cu and/or Ag in a range from 0.5 to 5.0 at % enhances the thermal stability of the soft magnetic properties of the head.

8 Claims, 6 Drawing Sheets

MAGNETIC HEAD USING SPECIFIED FE TA N CU OR FE TA N AG ALLOY FILM

This is a divisional of application No. 07/688,407 filed Apr. 22, 1991 now U.S. Pat. No. 5,304,258.

BACKGROUND OF THE INVENTION

The present invention relates to a magnetic material, and more particularly to a magnetic alloy film suitable for use in high-density magnetic recording and reproduction, which is required in digital video tape recorders (VTR's) and high-resolution VTR's and to a magnetic head using such a film.

A material for a core of magnetic heads has been required not only to have a high saturation flux density (Bs) but also to excel in hardness, corrosion resistance and thermal stability for soft magnetic properties. Conventionally, the cores of magnetic heads have been made of ferrite, sendust and Co-based amorphous material among others. The Bs levels of these materials, however, are only about 5 kG for ferrite, 10 kG for sendust and 8 kG for Co-based amorphous material and, thus, a material with a higher Bs level has been further called for to realize stable performance of high-density magnetic recording and reproduction.

In this connection, there is a recent report on a favorable soft magnetic film made of an alloy having a composition of FeMC (M:/Zr, Ti, Hf, Ta, Nb), having a Bs level of about 16 kG (Technical Report of the Society of Telecommunications, MR89-12 (1989)). This FeMC-based film, however, involves such problems yet to be solved as (1) susceptibility to rust because of its much carbon content, (2) insufficient hardness and the resultant low wear-resistance and (3) inability to provide a satisfactory soft magnetic alloy film surpassing 17 kG in a Bs level.

With a view to solving these problems, there has been proposed in Japanese Patent Laid-Open Publication No. 54-229408 (229408/1989) a magnetic alloy film having the composition of $Fe_xM_yN_z$, where M is at least one metal selected from a group of Zr, Nb, Hf, Ta, Mo and Ti, N is nitrogen, x, y, and z represent atomic percentages, $65 \leq x \leq 94$, $5 \leq y \leq 25$, $3 \leq z \leq 20$, and $x+y+z=100$.

Incidentally, the soft magnetic properties of the $Fe_xM_yN_z$ film is thermally stable in the range of about 550° to 550° C. Therefore, during glass deposition to process this film into a video head, the temperature cannot be raised beyond this range, leaving the glass still viscous and adversely affecting the product quality and yield. In order to achieve improvements in these respect, the thermal stability of the film should be further raised. In other words, a magnetic alloy film with greater thermal stability should be obtained.

SUMMARY OF THE INVENTION

An object of the present invention, therefore, is to provide a novel magnetic alloy film which has higher thermal stability and, thus, can contribute to raising the yield of head processing and the quality of the resultant heads.

Another object of the invention is to provide a magnetic head for use in VTR's, made of the above mentioned magnetic alloy film.

According to the invention, there is provided a magnetic alloy film having the composition of $(Fe_xM_yN_z)_aL_b$, where M is at least one metal selected from a group of Zr, Nb, Hf, Ta, Mo and Ti, L is Cu and/or Ag, x, y, z, a and b represent atomic percentages, $70.5 \leq x \leq 84$, $7 \leq y \leq 14$, $9 \leq z \leq 15.5$, $x+y+z=100$, $95 \leq a \leq 99.5$, $0.5 \leq b \leq 5$, and $a+b=100$.

Where the composition represented by x, y and z is achieved, there is obtained a superior soft magnetic alloy film whose Bs is 16 to 18 kG, the addition to which of Cu and/or Ag within the above stated range helps to make the crystalline grains even finer and to improve, in particular, the thermal stability of the soft magnetic properties. This result is presumably due to the fact that Cu and Ag have positive parameters of interaction with Fe, are low in solid solubility and tend to separate, so that, upon heating, either Fe atoms or Cu and Ag atoms gather by themselves to invite compositional fluctuation, and at this time the group of Cu and Ag atoms inhibits the growth of microcrystalline grains mainly consisting of Fe. The content b of Cu and/or Ag is within the range of 0.5 to 5 atomic %. If it is below 0.5 atomic %, the addition of Cu and Ag will have no significant effect to make the crystalline grains finer. On the other hand, if it is above 5 atomic %, the Bs and permeability will drop, which is undesirable. The especially desirable range of the content b of Cu and/or Ag is between 0.5 and 5 atomic %, within which a particularly satisfactory soft magnetic alloy film can be obtained, and the thermal stability of its soft magnetic properties is enhanced.

DETAILED DESCRIPTION OF THE PREFERRED EMBODIMENTS

Before describing a magnetic alloy film having the composition of FeMNL (M: Zr, Nb, Hf, Ta, Mo, Ti; L: Cu, Ag) according to the present invention, the characteristics of a magnetic alloy film having an FeMN composition in general will be described. The magnetic and anticorrosive performances of a magnetic alloy film having an FeMN composition resemble those of the magnetic film according to the invention.

Figure 1:
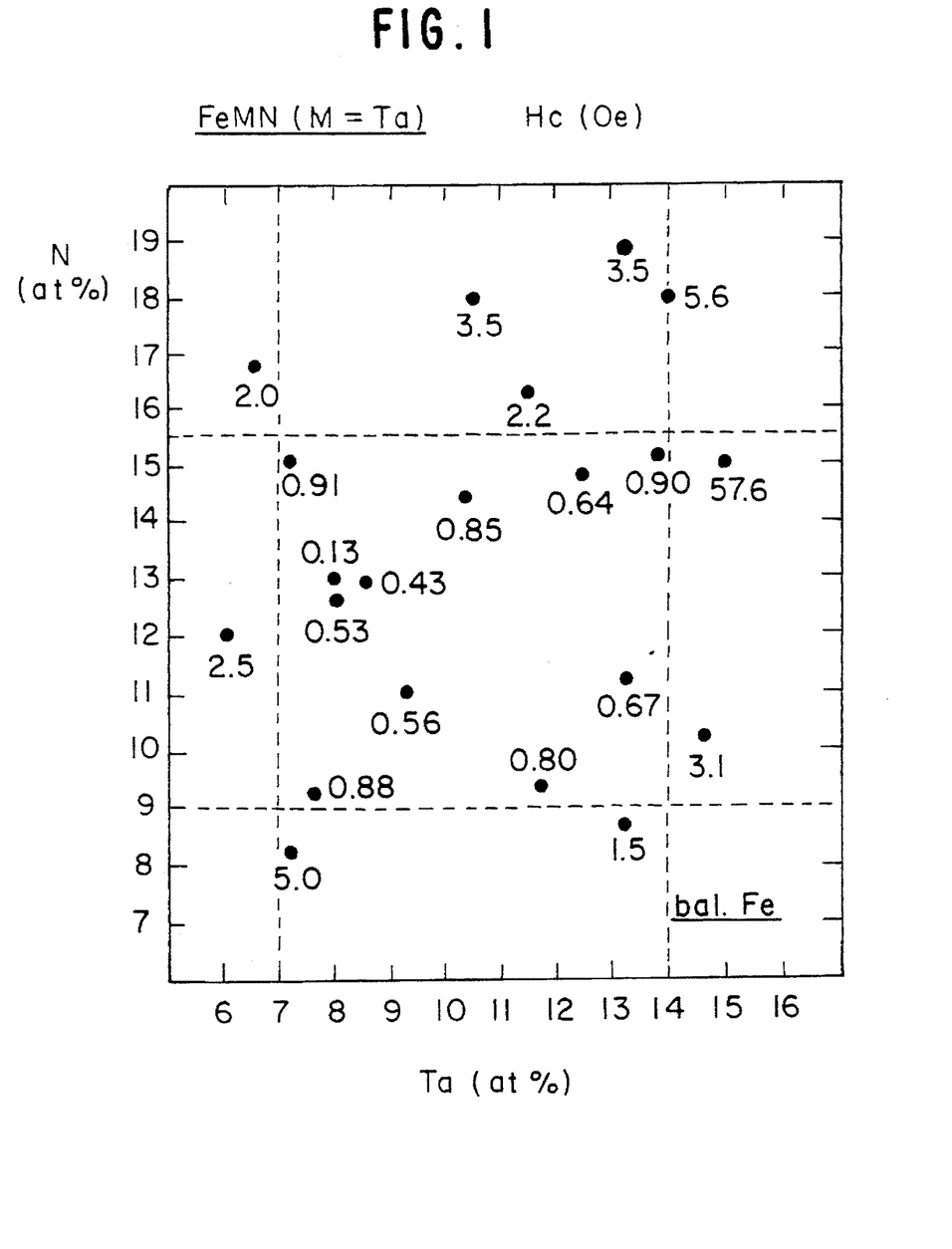
FIG. 1 illustrates coercive forces (Hc) of magnetic alloy films, in various FeMN(M:Ta) compositions, resembling a magnetic alloy film according to the present invention.

FIG. 1 shows coercive forces (Hc) of magnetic alloy films having various versions of FeMN composition where M is Ta. The FeTaN films of different compositions are formed in thicknesses of 2 to 6 microns by sputtering over crystallized glass substrates. N was supplied by adding $N_2$ gas into the sputter. The films, after being formed by sputtering, were subjected to heat treatment for one hour at 500° to 550° C. in a vacuum of no more than $1\times10^{-5}$ Torr. As shown in FIG.

1, the Hc was found no more than 1 (Oe), revealing satisfactory soft magnetic properties in the region where Ta was 7 to 14 at.% and N, 9 to 15.1 at.%.

Figure 2:
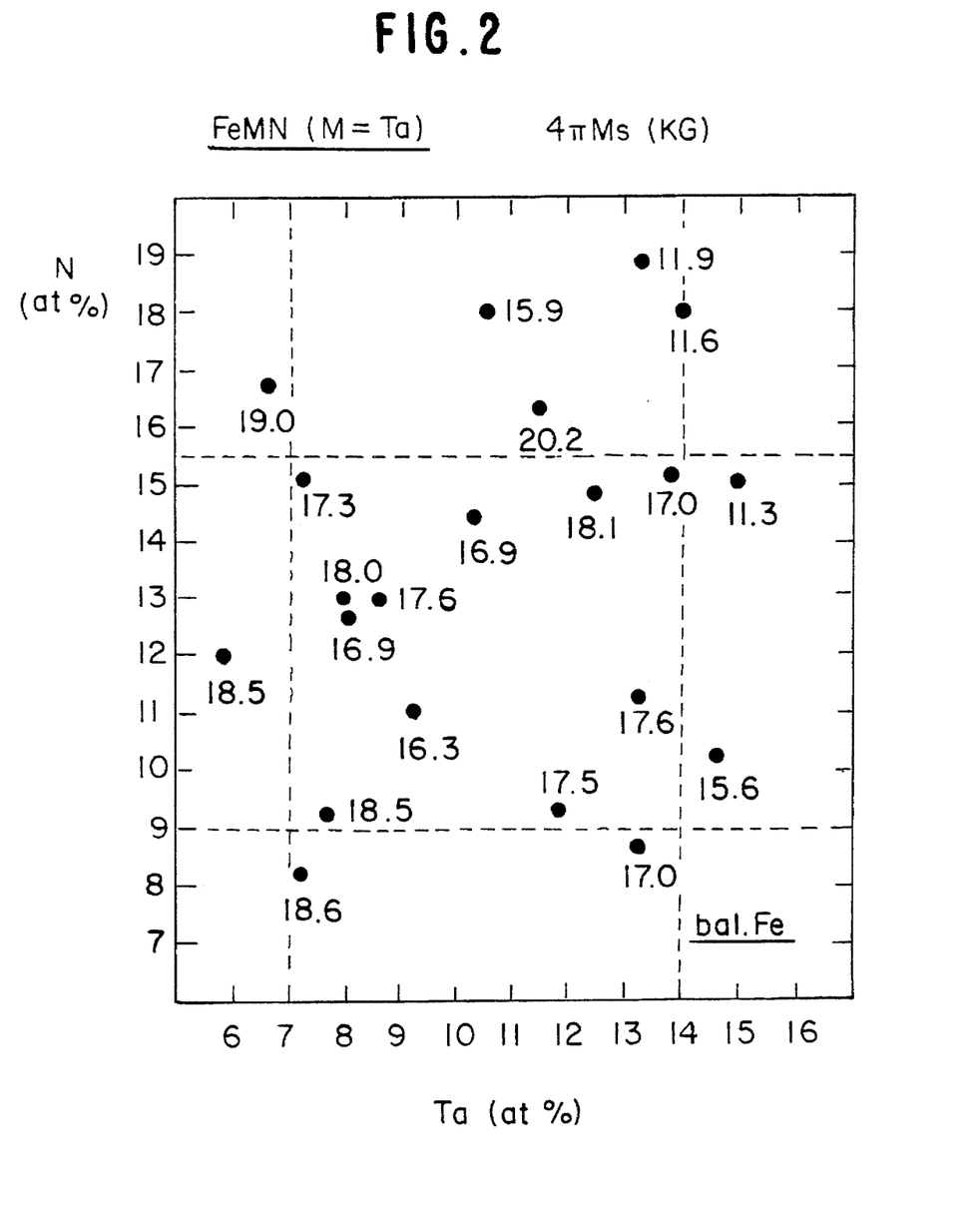
FIG. 2 illustrates saturated flux densities (Bs) of magnetic alloy films, in various FeMN(M:Ta) compositions, resembling a magnetic alloy film according to the invention.

FIG. 2 illustrates saturated flux densities (Bs) of magnetic alloy films having various versions of FeMN composition where M is Ta. In the region of FIG. 1 where the satisfactory soft magnetic properties was observed, the Bs was found as great as 16 to 18 kG.

Figure 3:
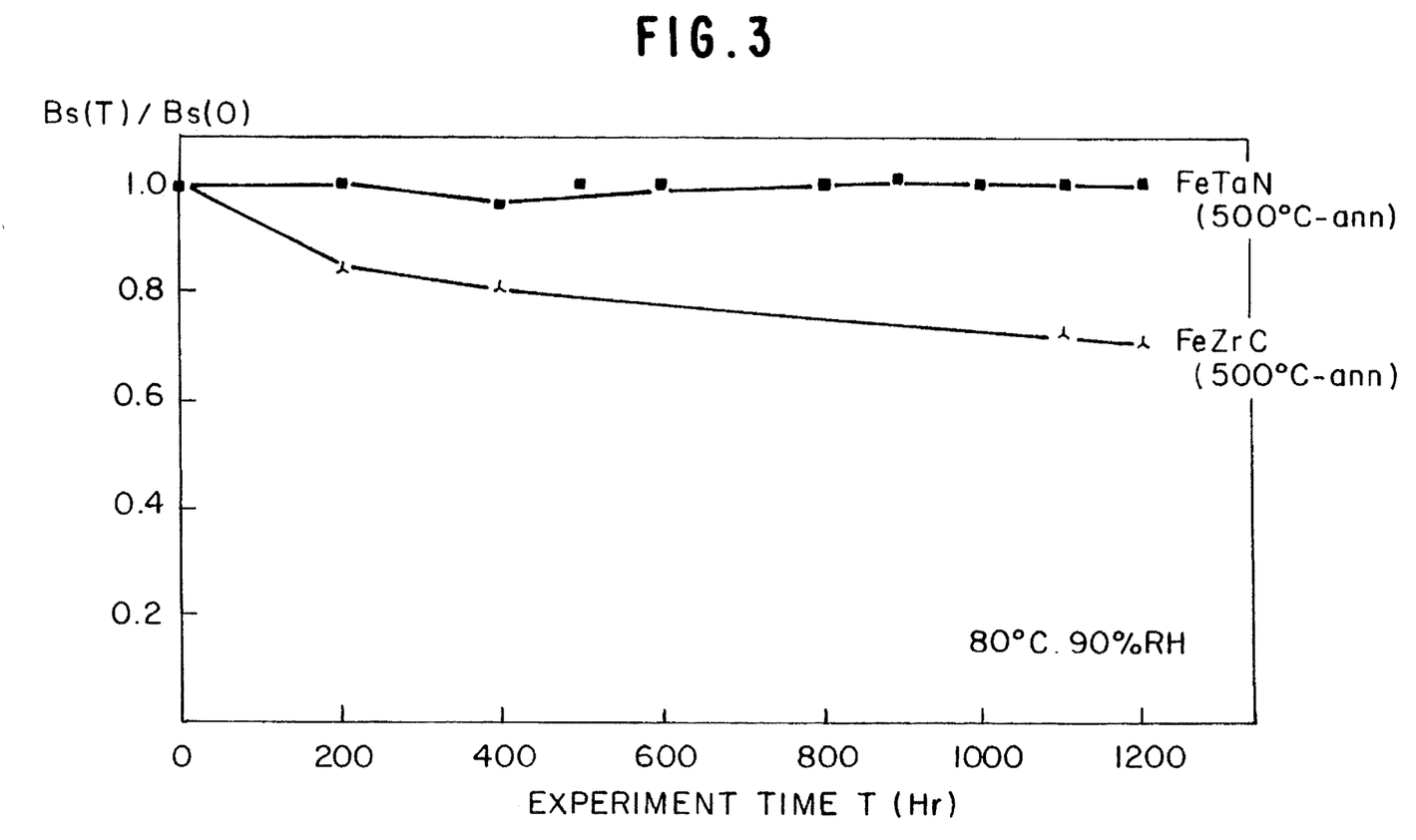
FIG. 3 illustrates changes in of the saturated flux density Bs over time, due to corrosion, of a magnetic alloy film having an FeMN composition resembling one according to the invention and of a magnetic alloy film having an FeMN composition according to the prior art.

FIG. 3 illustrates changes in Bs over time, due to corrosion (rust) in an atmosphere of 80° C. and 90% RH, of a magnetic alloy film having an FeTaN composition and one having an FeZrC composition according to the prior art. The FeZrC film, because of its C content, was quickly corroded, and its Bs was reduced to about 70% in 1,200 hours. By contrast, the FeTaN film, presumably owing to the N content which restrains corrosion, manifested no decrease in Bs even after the lapse of 1,200 hours.

The Vickers hardness (Hv) of the FeTaN was measured to range from 600 to 800, much greater than the at most 400 Hv level of a conventional FeMC film and as great as that of sendust. This presumably is due to the effect of N, which is well known to those skilled in the art.

Where Zr, Nb, Mo, Hf or Ti, instead of Ta, was used as M, similar results to Ta's are obtained. This is because, as stated above, Zr, Nb, Mu, Hf and Ti, like Ta, are active, and their magnetic performances can be explained by the microcrystalline texture which the film takes on, like in the case of Ta, as any of them selectively combines with N in the film when subjected to heat treatment.

The N content can also explain, as in the case of Ta, the improvement in corrosion resistance and hardness.

Next will be described the magnetic alloy film having a composition of FeMNL (M: Zr, Nb, Mu, Hf, Hf, Ti, Ta; L: Cu, Ag) according to the present invention.

The FeMNL film according to the invention is formed by a physical vapor phase growth method, such as sputtering or vacuum vaporization.

The FeMNL film immediately after its formation, in the composition according to the invention, has a structure containing a non-crystalline phase, and its Be is 15 kG or less. Going through appropriate heat treatment, the whole film takes on a microcrystalline grain texture and is improved in the soft magnetic properties, resulting in a Bs rise to between 16 and 18 kG.

The heat treatment is usually carried out in vacuum or in inert gas such as nitrogen gas and argon gas. The desirable temperature and duration of the thermal treatment, varying with the thickness and composition of the film, are usually 500° C. to 600° C., higher than the crystallizing temperature, and five minutes to 24 hours, respectively.

The conditions of temperature raising and lowering during the heat treatment can be changed as desired according to conditions. It is also possible to conduct heat treatment in a plurality of sessions or in a multi-stages at either the same temperature or different temperatures. Furthermore, this alloy can be subjected to heat treatment in a magnetic field of either DC or AC. This alloy can be given magnetic anisotropy by heat treatment in a magnetic field. Where the magnetic field is applied in the direction of the magnetic path of the core consisting of this alloy film and heat treatment is carried out, a particularly high squareness ratio is achieved, or where the magnetic field is applied in the direction normal to the magnetic path and heat treatment is conducted, the result is a low squareness ratio and a high permeability.

The magnetic field need not be applied throughout the whole duration of heat treatment, but a sufficient effect can be achieved by applying it only while the temperature is below the Curie temperature of the alloy pertaining to the present invention. In this alloy, the Curie temperature of the microcrystalline phase formed by heat treatment is higher than the Curie temperature of the non-crystalline state immediately after the film formation by sputtering, and thermal treatment in the magnetic field can be applied even at a temperature above the Curie temperature of the non-crystalline phase. Heat treatment in a rotating magnetic field may as well be conducted in part of the heat treatment process. Heat treatment can also be accomplished in two or more stages. Further, the magnetic properties can be adjusted by heat treatment while applying tension and compression.

The soft magnetic properties of the FeMNL film presumably is generated in the following mechanism. In the FeMNL film, grown by a physical vapor phase growth method such as sputtering or vapor deposition, bccFe crystalline grains are formed by the above mentioned heat treatment. At this time, M atoms which readily form a compound with nitrogen selectively produce nitrides to restrain the growth of the crystalline grains, resulting in a microcrystalline granular texture which exhibits favorable soft magnetism. Further, Cu and Ag contribute to improving the thermal stability of the soft magnetism for the above stated reason. The favorable soft magnetism exhibited by microcrystalline granular textures is well known to those skilled in the art through the aforementioned report, MR 89-12 (1989) and other pieces of literature.

An alloy containing such inevitable impurities as O, P, S and H or Ca, Sr, Ba and Mg, if their contents are not great enough to deteriorate the desired characteristics, can of course be regarded as similar to the alloy according to the present invention.

Next, magnetic films according to the invention, consisting of FeMNCu and, FeMNAg will be described in comparison with prior art magnetic films consisting of FeMN and MeMC (M: Ta, Zr, Nb). These magnetic films are produced as follows. After being grown on a crystallized glass substrate each to a thickness of 2 to 6 microns, they were subjected to heat treatment at 500° C. for 1 hour in a vacuum of $1 \times 10^{-5}$ Torr or below and in a rotating magnetic field of 710 Oe (at 10 rpm). With respect to these magnetic films, the saturated flux density (Bs), coercive force (Hc), permeability ($\mu$: at 10 MHz) and Vickers hardness (Hv) were measured. Then, the temperature of heat treatment at which the Hc surpassed 1 Oe (the duration was 1 hour), the maximum bearable temperature of the soft magnetism and the corrosion resistance (in terms of the presence or absence of rust after the lapse of 1,000 hours at 80° C. and 90% RH) were measured. The results are listed in Table 1.

The magnetic films of FeMNCu and FeMNAg were found equal in soft magnetic properties as, and higher in its maximum bearable temperature than, FeMN containing neither Cu nor Ag, though somewhat lower in Bs. Compared with the prior art FeMc, FeMNL (L: Cu, Ag) according to the present invention excelled in soft magnetic properties, Vickers hardness (Hv) and corrosion resistance. The slight differences in coercive force values (Bs) between Table 1 and FIG. 1 are due to differences in the conditions of heat treatment.

TABLE 1

| Composition | Bs (KG) | Hc (Oe) | μ (at 10 MHz) | Bearable Temperature (°C.) | Hv | Corrosion Resistance |
|---|---|---|---|---|---|---|
| $(Fe_{79}Ta_8N_{13})_{99.5}Ag_{0.5}$ | 17.5 | 0.15 | 3000 | 590° C. | 600–800 | ○ |
| $(Fe_{79}Ta_8N_{13})_{99}Cu_1$ | 17.5 | 0.15 | 3000 | 600° C. | 600–800 | ○ |
| $(Fe_{73}Ta_{12}N_{15})_{98}Ag_2$ | 16.1 | 0.2 | 2500 | 620° C. | 600–800 | ○ |
| $(Fe_{83}Zr_7N_{10})_{97}Cu_3$ | 17.0 | 0.25 | 2000 | 600° C. | 600–800 | ○ |
| $(Fe_{78}Nb_9N_{13})_{98}Cu_2$ | 17.2 | 0.2 | 2000 | 600° C. | 600–800 | ○ |
| $(Fe_{83}Zr_7N_{10})_{97}Cu_2Ag_1$ | 17.1 | 0.2 | 2000 | 600° C. | 600–800 | ○ |
| $(Fe_{73}Ta_{12}N_{15})_{98}Cu_5$ | 15.3 | 0.3 | 1500 | 650° C. | 600–700 | ○ |
| $Fe_{79}Ta_8N_{13}$ | 18.0 | 0.2 | 3000 | 550° C. | 600–800 | ○ |
| $Fe_{73}Ta_{12}N_{15}$ | 17.0 | 0.13 | 2600 | 580° C. | 600–800 | ○ |
| $Fe_{73}Zr_7C_{11}$ | 16.0 | 0.4 | 1800 | 620° C. | ~400 | |
| $Fe_{76}Zr_9C_{15}$ | 15.0 | 0.5 | 1500 | 650° C. | ~400 | |

The same holds true in the cases where Mo, Hf or Ti, other than Ta, Zr and Nb, is used as M. The magnetic performances in these cases can be explained by the above mentioned activity of Mo, Hf or Ti, which selectively combines with N in the film under heat treatment, resulting in a film having a microcrystalline granular texture as in the cases of Ta, Zr and Nb.

The content of N also explains the improved corrosion resistance and hardness as in the cases of Ta, Zr and Nb.

Figure 4:
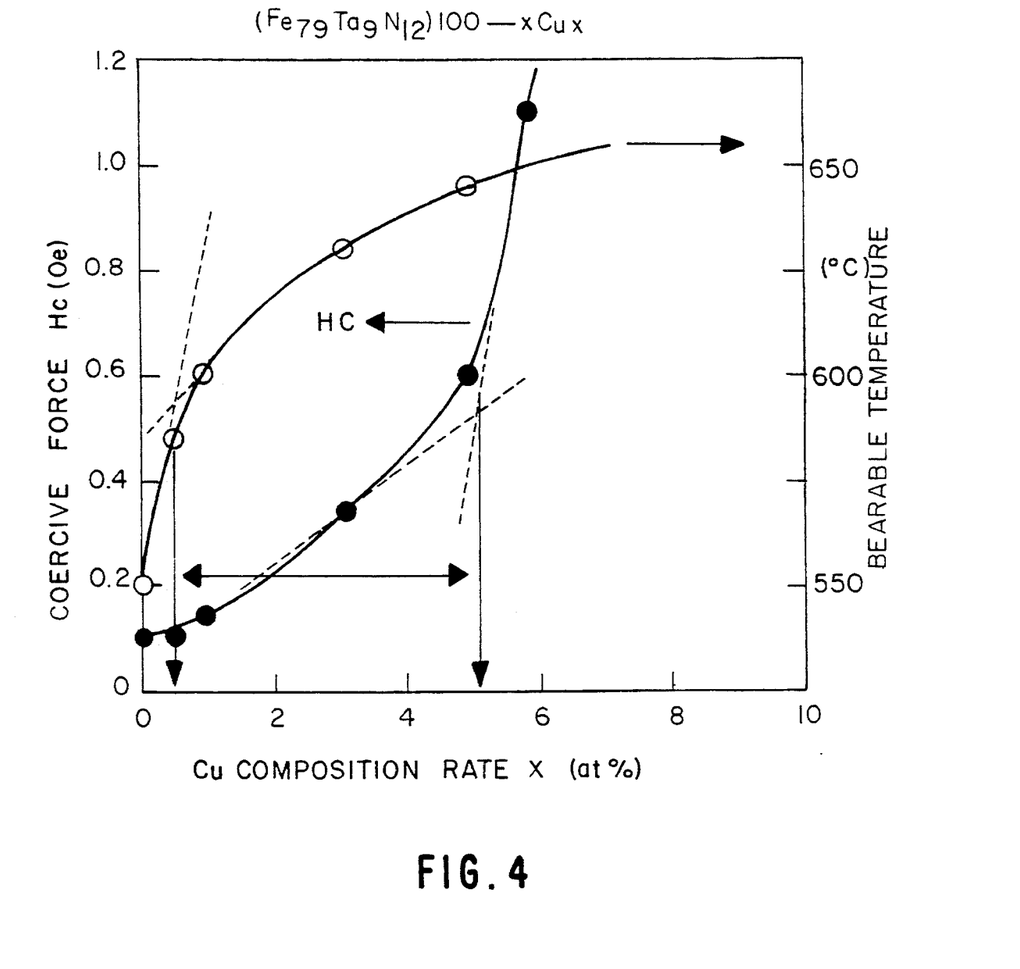
FIG. 4 illustrates changes in coercive force (Hc) and thermal stability of the magnetic alloy film according to the invention having an FeTaNCu composition.

FIG. 4 shows the variations of magnetic alloy films consisting of $(Fe_{79}Ta_9N_{12})_{(100-x)}Cu_x$ in coercive force (Hc) and maximum bearable temperature with respect to changes in Cu content. As illustrated, although the maximum bearable temperature (the critical temperature of heat treatment for keeping Hc from exceeding 1 (Oe)) rises in accordance with an increase in Cu content, the Hc at the optimal heat treatment temperature also rises. If the Cu content is too low, the effect of the rise in the maximum bearable temperature is reduced. These findings point out the effective range of the quantity of Cu added between 0.5 at.% and 5 at.%.

Figure 5:
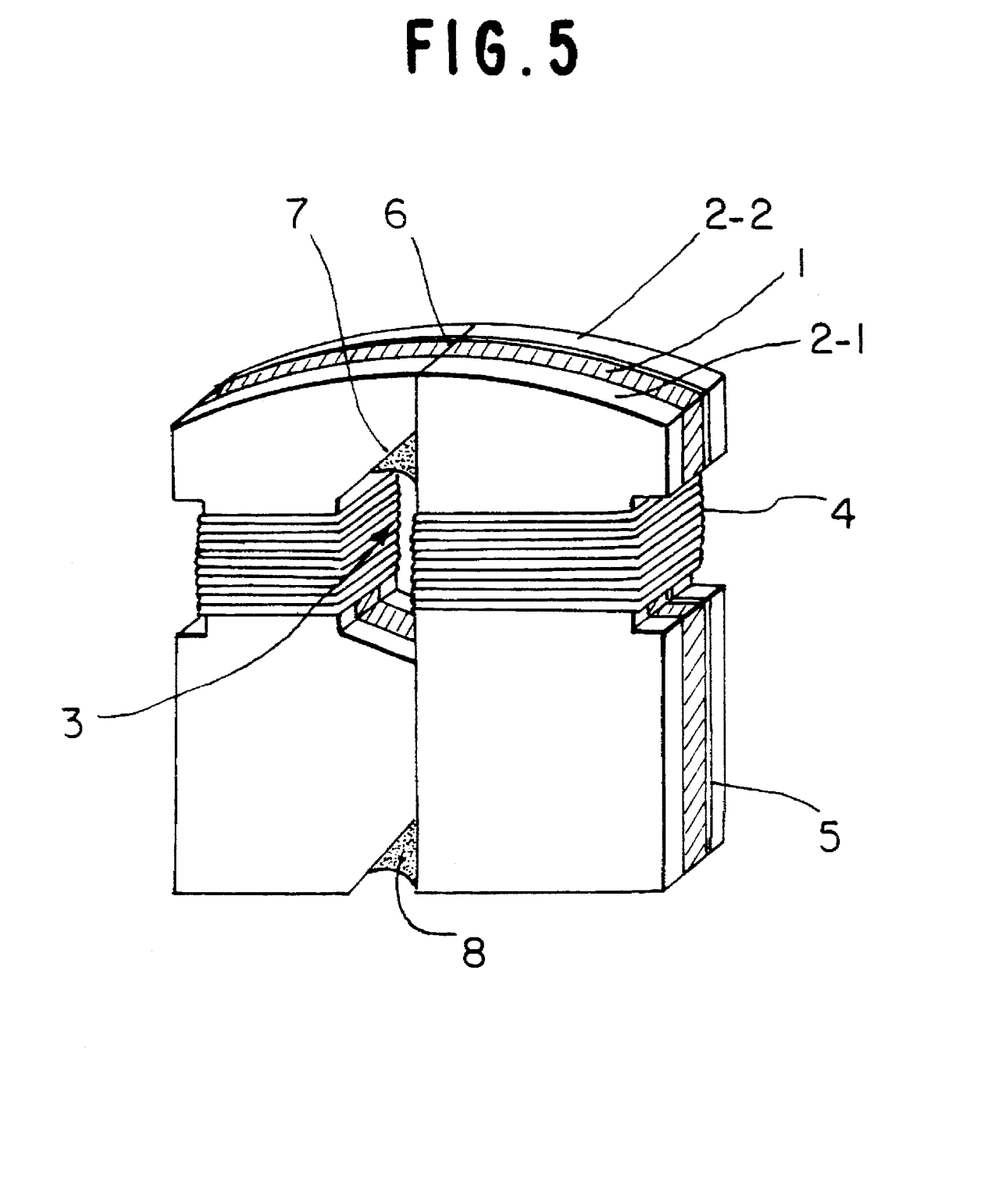
FIG. 5 illustrates structure of a magnetic head using the magnetic alloy film, according to the invention.
Figure 6:
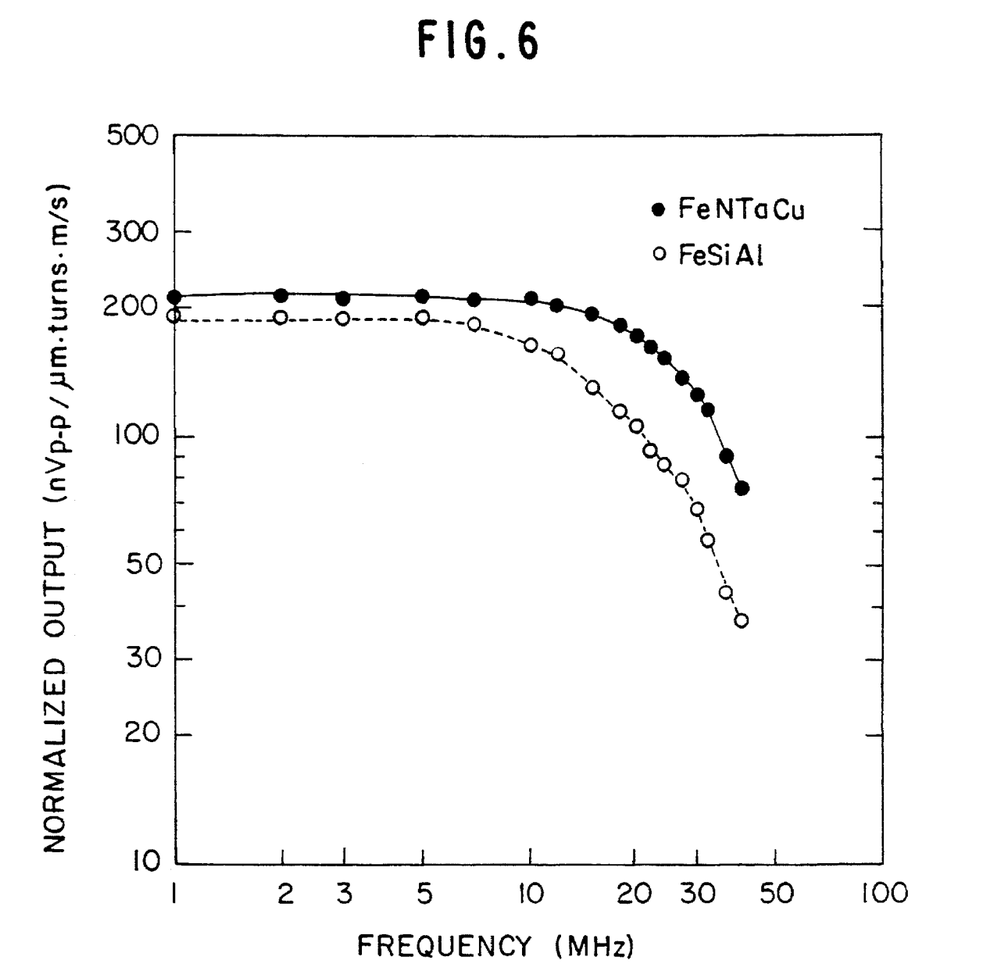
FIG. 6 is a diagram showing a frequency characteristic of the magnetic head according to the invention in comparison with that of one according to the prior art.

FIG. 5 illustrates another embodiment of the present invention, i.e., a magnetic head. The illustrated magnetic head has a magnetic core 1, which consists of four layers of film, formed by sputtering and consisting of Fe(78.7 at.%)—N(11.0)—Ta(9.3)—Cu(1.0) in a thickness of 5 microns, with 0.1 micron thick intermediate $Al_2O_3$ layers in-between. The film thickness corresponds to track width. This magnetic core film and a substrate 2—2 are joined by a glass layer 5. The magnetic head is formed by joining two halves with a gap 6 having a certain gap length, and has a coil winding window 3. Reference numeral 4 denotes a coil. The halves are integrated by joining glass pieces 7 and 8. A head face engaging with a recording medium (magnetic tape) is rounded as illustrated to come into good contact with the medium. The magnetic characteristics of the FeTaNCu were found to be $4\pi$ Ms 17 kG in saturated flux density and about 2,000 in permeability (μ). FIG. 6 shows, together with the corresponding characteristic of a conventional head consisting of a FeSiAl alloy film, the frequency dependence of the normalized output of the magnetic head of the present invention when a metal tape, having a coercive force of 1,500 Oe, running at a speed of 21 m/sec relative to the magnetic head. The magnetic characteristics of the FeSiAl film were $4\pi$ Ms 10 kG in saturated flux density and about 1,000 in permeability (μ) (at 20 MHz). The high $4\pi$ Ms level and high μ level of the FeTaNCu film result in a greater output than that of the conventional head at a high frequency as well.

Films of not only FeTaNCu but also soft magnetic alloy of any of the aforementioned compositions gave a high-power head, the more so at higher $4\pi$ Ms and μ levels.

As hitherto described, the present invention provides a magnetic film for use in the core of a magnetic head, consisting of FeMNL (M: Zr, No, Hf, Ta, Mo, Ti; L: Cu, Ag) and excelling in corrosion resistance, hardness and satisfactory soft magnetic properties stable against heat. The invention further makes it possible, by using this magnetic film, to provide a magnetic head for high density magnetic recording/reproducing of high quality, available at a high yield in the manufacturing process.

What is claimed is:

1. A magnetic head including a magnetic core comprising a magnetic alloy material having the composition of $(Fe_{79}Ta_8N_{13})_{99}Cu_1$..

2. A magnetic head, as claimed in claim 1, wherein said magnetic alloy material is formed by a sputtering process.

3. A magnetic head, as claimed in claim 1, wherein said magnetic alloy material has a structure sandwiched between alumina layers.

4. A magnetic head, as claimed in claim 1, wherein said magnetic core consists of two components, which are assembled with glass material with a head gap of a prescribed width left open.

5. A magnetic head including a magnetic core comprising a magnetic alloy material having the composition of $(Fe_{79}Ta_8N_{13})_{99.5}Ag_{0.5}$..

6. A magnetic head, as claimed in claim 5, wherein said magnetic alloy material is formed by a sputtering process.

7. A magnetic head, as claimed in claim 5, wherein said magnetic alloy material has a structure sandwiched between alumina layers.

8. A magnetic head, as claimed in claim 5, wherein said magnetic core consists of two components, which are assembled with glass material with a head gap of a prescribed width left open.

* * * * *

UNITED STATES PATENT AND TRADEMARK OFFICE
CERTIFICATE OF CORRECTION

PATENT NO.   : 5,475,554
DATED        : December 12, 1995
INVENTOR(S)  : Nobuyuki ISHIWATA, Chizuko WAKABAYASHI It is certified that error(s) appears in the above-identified patent and that said Letters Patent is hereby corrected as shown below:

On the title page, item

[54] Please delete the title and insert --ALLOY FILM MAGNETIC HEAD USING SPECIFIED FETANCU OR FETAN AG--.

Col. 5, TABLE 1, first row under "Bs (KG)", delete "17.5", insert --17.7--.

Signed and Sealed this

Twenty-fifth Day of June, 1996

Attest:

BRUCE LEHMAN

*Attesting Officer*     *Commissioner of Patents and Trademarks*